United States Patent [19]

Oka

[11] 3,813,690

[45] May 28, 1974

[54] TAPE RECIPROCATING DRIVE TYPE TAPE RECORDER

[75] Inventor: Toshiichiro Oka, Yokohama, Japan

[73] Assignee: Victor Company of Japan, Ltd., Yokohama City, Kanagawa-ken, Japan

[22] Filed: June 15, 1972

[21] Appl. No.: 263,289

[30] Foreign Application Priority Data

June 15, 1971 Japan .............................. 46-42833

[52] U.S. Cl. .................................. 360/90, 242/201

[51] Int. Cl. ........................................... G11b 15/26

[58] Field of Search .................... 242/201, 202, 204; 274/4 D, 4 C, 11 C

[56] References Cited

UNITED STATES PATENTS 3,419,686 12/1968 Rhoades ............................ 242/201

*Primary Examiner*—Harry N. Haroian

*Attorney, Agent, or Firm*—Holman & Stern

[57] ABSTRACT

A tape reciprocating drive type tape recorder has two pulleys having a suitable degree of frictional resistance and rotatably mounted on the opposite ends of a swinging arm in a manner to confront two reel bases and means for transmitting rotational power in a regular direction or reverse direction to the two pulleys. The swinging arm swings in accordance with the rotational direction of the two pulleys, whereby, in accordance with the rotational direction thereof, one of the pulleys presses against the corresponding reel base to transmit rotational power thereto. By merely changing over the rotational direction of the pulleys, the two pulleys can be selectively caused to press against the reel bases.

6 Claims, 8 Drawing Figures

TAPE RECIPROCATING DRIVE TYPE TAPE RECORDER

BACKGROUND OF THE INVENTION

This invention relates to a tape recorder and more particularly to a tape recorder of the tape reciprocating drive type. More specifically, the invention relates to a reciprocating drive tape recorder having mechanisms whereby a capstan can be selectively rotated in either of two directions (regular and reverse), and the magnetic tape can be selectively driven in the forward direction or in the reverse direction.

In general, a tape recorder of the type in which a magnetic tape can be selectively driven to travel in the forward direction or in the reverse direction requires means such as means for causing a capstan to rotate in regular and reverse directions, means for selectively rotating two reels in take-up directions, means for pressing the tape selectively against a group of magnetic heads for forward and reverse tape travel directions, and means for carrying out fast tape travel with respect to the forward and reverse directions.

In tape recorders known heretofore, means and mechanisms capable of accomplishing these functions have invariably been of complicated construction, whereby they have required a large number of components and constituent parts and entailed high costs and unreliable operation.

SUMMARY OF THE INVENTION

Accordingly, it is an object of the present invention to provide an original and useful reciprocating drive type tape recorder of a very simple organization wherein the above described difficulties encountered in the prior art have been overcome.

Another object of the invention is to provide a reciprocating drive type tape recorder having a mechanism whereby, by merely causing the rotational direction of a motor to change between regular and reverse, the transmission of tape take-up rotation to a reel can be selectively changed over.

Still another object of the invention is to provide a reciprocating drive type tape recorder having a mechanism whereby, by merely causing the rotational direction of a motor to change between regular and reverse, the tape can be pressed selectively against a magnetic head corresponding to the forward or reverse tape travel direction in a correlated manner with the above described operation.

A further object of the invention is to provide a reciprocating drive type tape recorder having a mechanism wherein, in correspondence with the direction of rotation of pulleys provided on the two ends of one swinging arm, the swinging arm rotates, and in intercoupled relation therewith, the operational actions of reel rotation and pressing of the tape against the heads are carried out selectively.

Other objects and notable features of the present invention will be apparent from the following detailed description with respect to a preferred embodiment of the invention when read in conjunction with the accompanying drawings, throughout which like parts are designated by like reference numerals.

DETAIL DESCRIPTION

Figure 1:
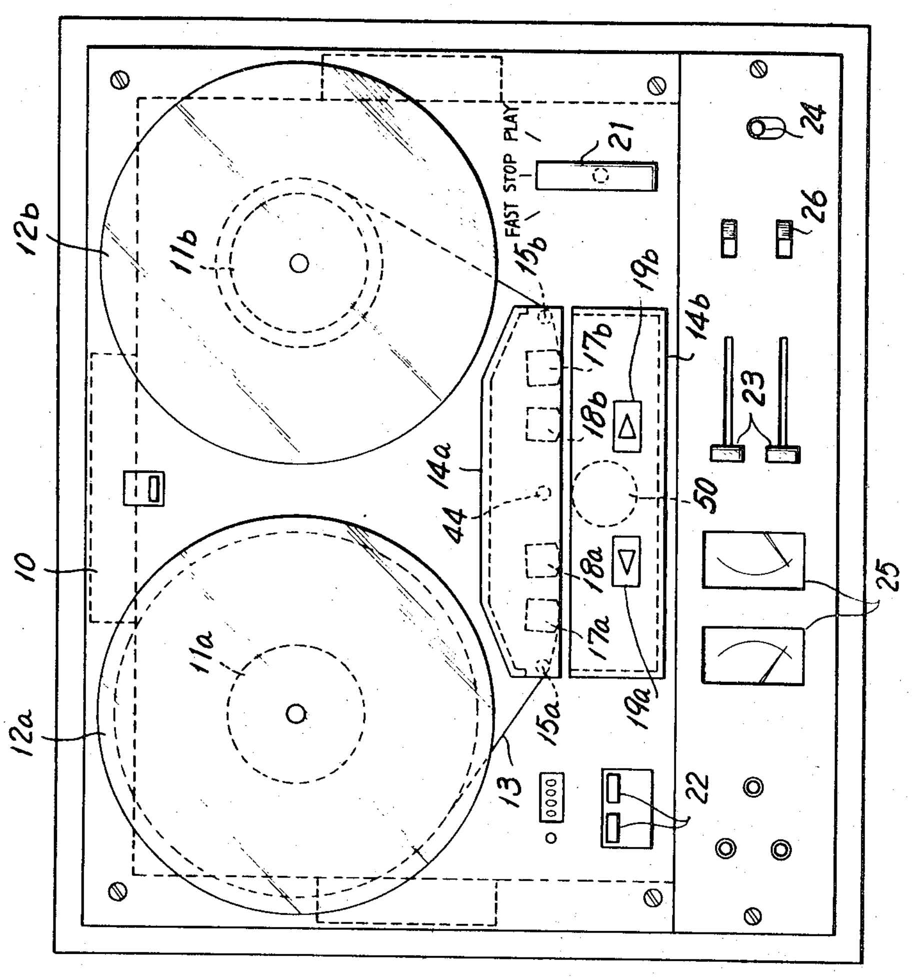
FIG. 1 is a plan view showing the exterior of one embodiment of the tape recorder according to the invention.

The embodiment of the tape recorder of the tape reciprocating type according to the present invention has an external appearance in top plan view as shown in FIG. 1. The mechanisms of this tape recorder are housed in a casing closed by a top panel 10. Reel discs 11*a* and 11*b* are exposed above the top panel 10 and function to support thereon reels 12*a* and 12*b*. A magnetic tape 13 unwound from the reel 12*a* is passed forwards through a gap between head covers 14*a* and 14*b* and then taken up and wound on the reel 12*b*. Alternatively, a tape is taken up on the reel 12*a* in reverse direction from the reel 12*b*.

At the two ends of the interior of the head cover 14*a*, there are provided sensing poles 15*a* and 15*b* serving additionally as guide poles, and a capstan 44 is provided centrally therebetween. Between the sensing pole 15*a* and the capstan 44, there are provided an erasing head 17*a* and a recording and reproducing magnetic head 18*a* for forward tape travel, while between the sensing pole 15*b* and the capstan 44, there are provided an erasing heads 17*b* and a recording and reproducing magnetic head 18*b* for tape travel in the reverse direction. The head cover 14*b* is provided on the upper surface thereof with button 19*a* and 19*b* for selection of tape travel direction and in the interior thereof with a pinch roller 50 in a freely movable state.

On the top panel 10, there is provided a control knob 21 which can be turned to change over between the three positions of record-reproduction, stop, and fast travel. On the top panel 10, there are further provided controls ordinarily used in a tape recorder, such as a recording operation button 22, slide volume knob 23, power supply switch 24, level meter 25, tape select switch 26 etc.

The construction of the mechanisms of one embodiment of the tape recorder of the invention will now be described with reference to FIGS. 2 through 8.

The tape recorder is powered by a motor 40 secured to the lower surface of a chassis plate 41. This motor, the rotation of which is reversible, has a shaft 42 supporting a pulley 43 fixed thereto. This pulley 43 has two sheave parts 43*a* and 43*b* of different diameters and a plain cylindrical part 43*c*. A capstan 44 is rotatably journaled by a bearing 46 fixed to and through a sub-chassis plate 45 and fixedly supports at its lower end a flywheel 47. An endless rubber belt 48 is stretched around the pulley 43 and the flywheel 47 and can be shifted between the sheave parts 43*a* and 43*b*.

A pinch roller 50 is rotatably supported on a pivot pin 52 embeddedly fixed to the end of one arm of a lever 51 of bellcrank shape, which is pivotally supported on a pin 53. Te pinch roller 50 is disposed above the upper surface of the sub-chassis plate 45 from a slot provided in the plate 45. The lever 51 is energized with a clockwise rotational force by a spring (not shown). On the end of the other arm of this lever 51, there is pivoted one end of a lever 54 having at the other end thereof a yoke with U-shaped slot engaged with a pin 57 embeddedly fixed to one end of a lever 56 pivoted on a pin 55 and energized in counterclockwise. A roller 58 is provided on the other end of the lever 56 and is pressed against the peripheral cam surface of a cam 59. This cam 59 is fixed to a rotatable shaft 60 of the aforementioned operation knob 21 and, therefore, rotates together with the operation knob 21. Furthermore, the cam 59 has, around its outer periphery, notches of wave form, against which is pressed a roller 62 of a lever 61 urged in the counterclockwise direction. The cam 59 moves in a clock motion through the three positions of record-reproduction, stop, and fast travel.

A sliding bar 63 is extending parallely to the line on which the centers of the two reel discs. The sliding bar 63 is guided by pins 64*a* and 64*b* engaged with slots formed in the bar 63 and embeddedly fixed to the chassis plate 41 and is slidable in the left and right directions. One end of this sliding bar 63 is coupled to one end of a lever 66 pivoted at its midpoint by a pivot pin 65. The other end of the lever 66 is coupled to the cam 59. Accordingly, as the cam 59 undergoes the above described rotation, the sliding bar 63 slides through the three positions of left, center, and right.

On the side part of the sliding bar 63, there are provided recessed parts 63*a* and 63*b* and projections 63*c*, 63*d*, and 63*e* which function as cams. The recessed parts 63*a* and 63*b* are engaged by pins 68*a* and 68*b* secured to the ends of brake levers 67*a* and 67*b* on one side thereof. The brake levers 67*a* and 67*b* are respectively pivoted on pivot pins 69*a* and 69*b* and are urged respectively clock-wise and counterclockwise by springs (not shown) in directions such that brake shoes 70*a* and 70*b* supported on their other ends are pressed against the peripheral surfaces of the reel discs 11*a* and 11*b*.

On one end of a lever 72 pivoted on a pin 71, there is provided a pulley 74 rotatably supported on a pivot shaft 73. The other end of the lever 72 rotatably supports a roller 75 for contacting the projection 63*e* of the sliding bar 63. The pulley 74 is confronting the plain wheel part 43*c* of the pulley 43 and has around its outer periphery a rubber tire 76 for frictional contact with the plain wheel part 43*c*.

A swinging arm 77 is so supported by a pivot shaft 78 that it can undergo swing movement in a horizontal plane and a parallel movement in the vertical direction. On the left and right ends of the swinging arm 77, pulleys 79*a* and 79*b* are rotatably supported by pins 80*a* and 80*b*. The lower surfaces of the pulleys 79*a* and 79*b* are lined with felt 81*a* and 81*b* bonded thereto. These felt linings are pressed by the upper surface of friction plates 82*a* and 82*b* fixed to the upper surface of the swinging arm 77 as a result of the force of pressure springs 83*a* and 83*b*. Consequently, a suitable frictional resistance is applied to the pulleys 79*a* and 79*b*. The pulleys 79*a* and 79*b* are respectively confronting the side surfaces of the left and right reel discs 11*a* and 11*b*. An endless rubber belt 84 is stretched in a substantially triangular form around the pulleys 79*a*, 79*b*, and 74.

Figure 5:
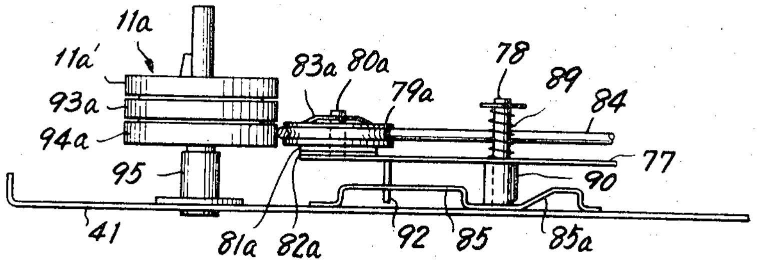
FIGS. 5 and 6 are respectively front and side elevations showing various parts of the reel disc and neighboring parts of the mechanisms in the state indicated in FIG. 4.
Figure 8:
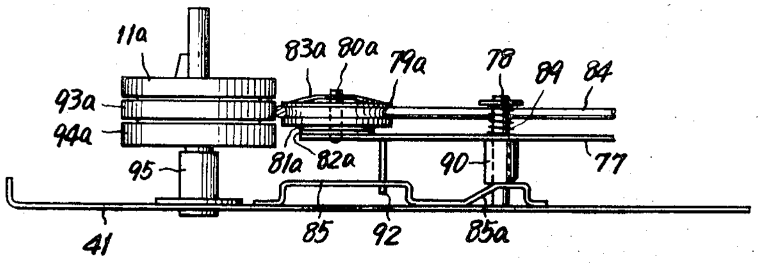
FIG. 8 is a front elevation showing various parts of the reel base and neighboring parts of the mechanisms in the state indicated in FIG. 7.

Below the swinging arm 77, there is disposed a sliding cam bar 85 having a slot 86, through which the shaft 78 is passed. The two ends of a lever 87 pivoted on a pin 88 are engage respectively with the sliding bar 63 and the swinging arm. For this reason, the sliding cam bar 85 is caused to slide in the left and right direction along the slot 86 through the lever 87 in accordance with the left and right movement of the sliding bar 63. The sliding cam bar 85 is provided with a cam surface 85*a* as shown in FIGS. 5 and 8. A contact member 90 provided on the lower surface of the swinging arm 77 and subjected continually to a downward force by a spring 89 is continually pressing against the upper surface of the sliding cam bar 85. The sliding cam bar 85 is further provided with an opening 91 of hour-glass shape, through which a pin 92 projecting from the lower surface of the swinging arm 77 is passed.

Figure 6:
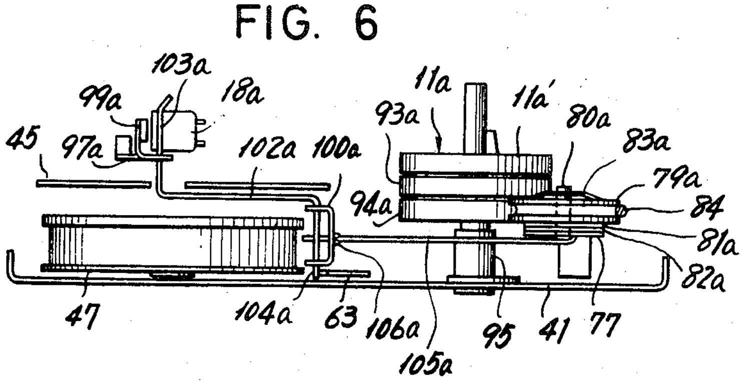

A take-up disc 94*a* is pressed against the lower surface of a friction disc 93*a*, which in turn is pressed against the lower surface of the reel disc 11*a* as shown in FIGS. 5, 6, and 8. These parts are rotatably supported by a bearing 95 in a mutually slippable state. A similar construction of parts is provided also with respect to the reel disc 11*b*. In accordance with the vertical movement of the above described swinging arm 77, the pulley 79*a* selectively confronts the friction disc 93*a* or the take-up disc 94*a*. The pulley 79*b* operates similarly.

Levers 96*a* and 96*b* are pivoted at their ends on pins 95*a* and 95*b* and at their other ends pivotally support the middle parts of arms 97*a* and 97*b*, respectively. On the ends of the arms 97*a* and 97*b*, there are respectively mounted pads 98*a* and 98*b* for pressing a tape against the erasing heads 17*a* and 17*b* and pads 99*a* and 99*b* for pressing the tape against the recording and reproducing heads 18*a* and 18*b*. Levers 100*a* and 100*b* are respectively pivoted on pins 101*a* and 101*b* and are respectively urged to rotate by springs (not shown) in the counterclockwise direction and the clockwise direction. One end of the lever 100*a* and the arm 97*a* are connected by a rod 102*a*, while one end of the lever 100*b* and the arm 97*b* are connected by a rod 102*b*. As indicated in FIG. 6, the rod 102*a* has an extension 103*a* passing through the arm 97*a* to extend upward and an extension 104*a* passing through the lever 100*a* to extend downward. The extension 104*a* is pressed against a projection 63*c* of the sliding bar 63. The above description ralating to the rod 102*a* is applicable also to the rod 102*b*.

Rods 105*a* and 105*b* are pivotally connected at their ends on one side to parts of the swinging arm 77 near the two ends thereof, and their other ends are respectively passed through levers 100*a* and 100*b*. Near the other ends of the rods 105*a* and 105*b*there are provided protuberance or enlarged parts 106*a* and 106*b*, which push levers 100*a* and 100*b* when the rods 105*a* and 105*b* move.

One end of a lever 107 pivoted on a pin 69*a* is provided with a pin 108 for contacting the recess 63*a* of the sliding bar 63. The other end of this lever 107 is engaged with an operating member 110 of a power-supply switch 109 for an electrical circuit of components such as an amplifier (not shown).

The embodiment of the tape recorder of the above described construction according to the present invention operates in the following manner.

Figure 2:
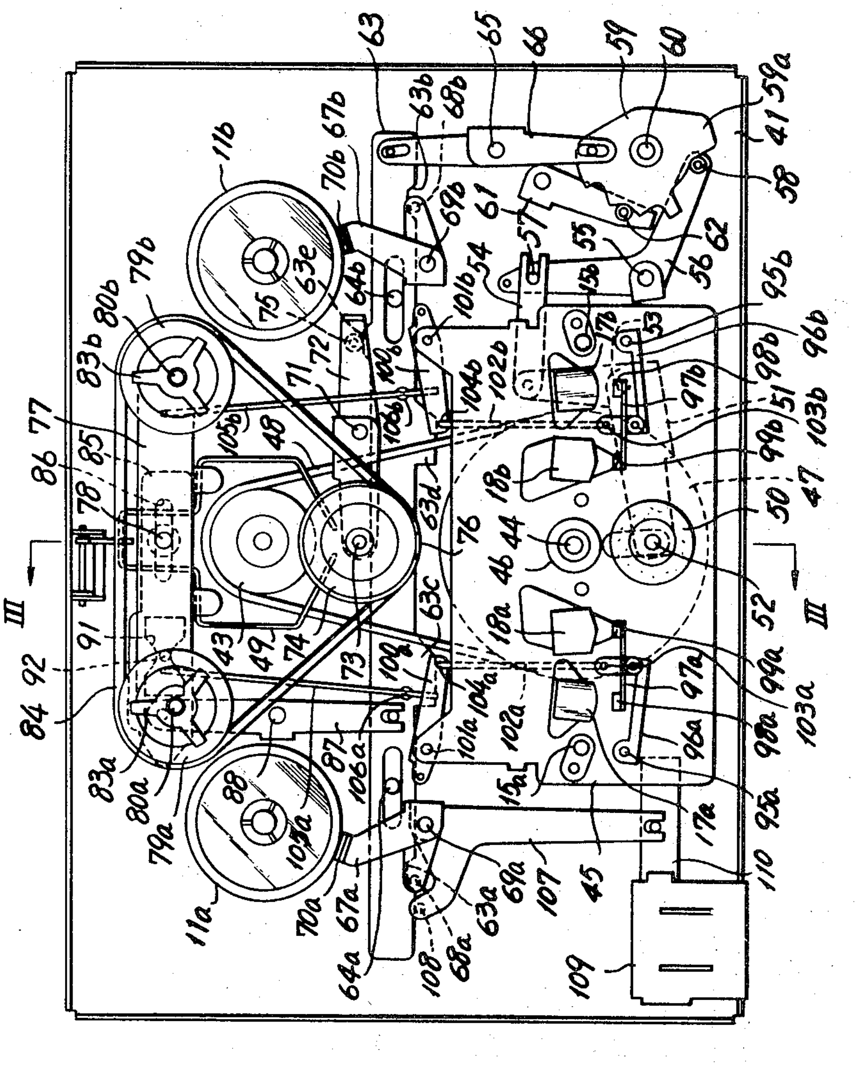
FIG. 2 is a plan view showing the same tape recorder with its top panel removed to show the essential mechanisms thereof, which are shown in the stopped or inoperative state.
Figure 3:
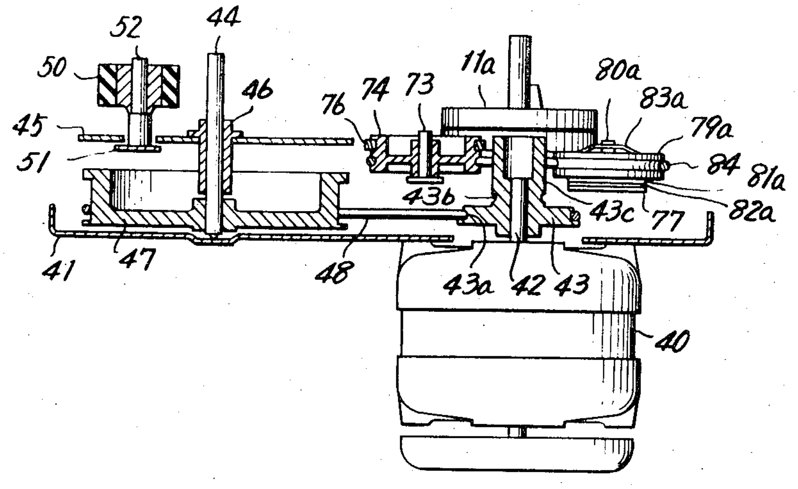
FIG. 3 is a vertical sectional view taken along the line III—III in FIG. 2.

When the tape recorder is in the stopped or inoperative state, the various mechanisms thereof are in the states indicated in FIG. 2. Furthermore, the control knob 21 shown in FIG. 1 is in the state wherein the "STOP" position indicated. The rotation of the motor 40 in one direction is transmitted by way of the belt 48 to the flywheel 47 to drive the capstan 44. However since the roller 58 of the lever 56 is in contact with a valley or recessed part of the cam 59, the lever 56 is in a position where it has turned in the counterclockwise direction, and through the lever 54 the lever 51 is in the position where it has been turned in the counterclockwise direction. Consequently, the pinch roller 50 rotatably supported on the lever 51 is separated apart from the capstan 44. For this reason the magnetic tape 13 is not driven.

The sliding bar 63 is in the central position, and the pins 68*a* and 68*b* of the brake levers 67*a* and 67*b* are in the recesses 63*a* and 63*b* of the sliding bar 63. For this reason, the brake levers 67*a* and 67*b* are in positions where they have turned respectively in the clockwise and counterclockwise directions, and the brake shoes 70*a* and 70*b* are respectively presed against the reel bases 11*a* and 11*b* and are applying braking force thereto. Furthermore, since the roller 75 is in a position where it has moved onto the projection 63*e*, the lever 72 is in a position where it has turned in the counterclockwise direction, and the pulley 74 is separated from the pulley 43. For this reason, none of the pulleys 74, 79*a*, and 79*b* is rotating.

Since the sliding cam bar 85 is coupled by the lever 87 to the sliding bar 63, it is in its center position. The pin 92 fixed to and projecting from the lower surface of the swinging arm 77 is positioned at the most constricted part of the opening 91. Consequently, the swinging motion of the swinging arm 77 is suppressed, and the pulleys 79*a* and 79*b* are both separated from the reel discs 11*a* and 11*b*.

Since the end parts 104*a* and 104*b* of the rods 102*a* and 102*b* are being pushed by the projections 63*c* and 63*d* of the sliding bar 63, the levers 100*a* and 100*b* are respectively in positions where they have rotated in the clockwise and counterclockwise directions and, acting through the rods 102*a* and 102*b*, have caused the levers 96*a* and 96*b* to rotate respectively in the clockwise and counterclockwise directions. For this reason, the pads 98*a*, 98*b*, 99*a*, and 99*b* are respectively separated from the heads 17*a*, 17*b*, 18*a*, and 18*b*. Furthermore, the magnetic tape is separated from the heads 17*a*, 17*b*, 18*a*, and 18*b* by the extensions 103*a* and 103*b* of the rods 102*a* and 102*b*. In addition, since the pin 108 is disengaged from the recess 63*a* of the sliding bar 63, the lever 107 is in a position where it has turned in the counterclockwise direction and has caused the operating member 110 to move toward the right. Accordingly, the switch 109 is in its opened state, and the amplifier is inoperative.

Figure 4:
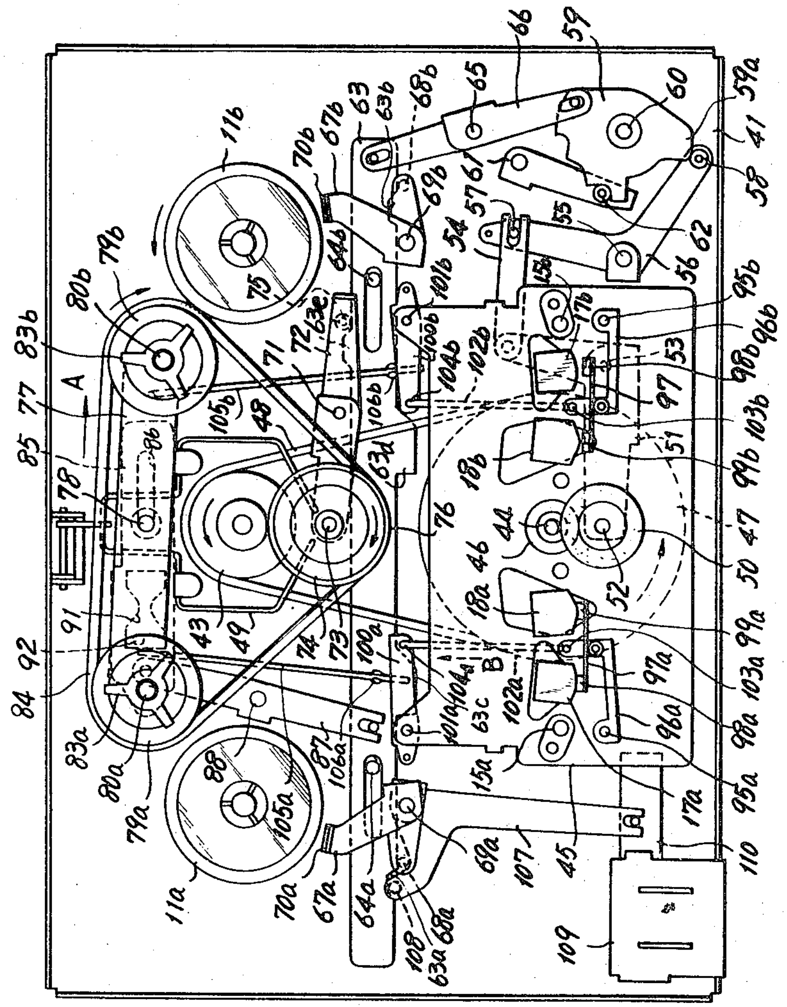
FIG. 4 is a plan view showing the tape recorder of the invention with its mechanisms in the recording and reproducing state.

When the tape recorder is to be placed in the recording and reproducing state, the operation knob 21 is turned in the clockwise direction, whereupon the cam 59 also rotates in the clockwise direction to assume the state indicated in FIG. 4. The roller 58 thereby rolls onto the projecting part 59a of the cam 59, and the lever 56 is thereby rotated in the clockwise direction, whereby the lever 51 is released from its engaged state through the lever 54 and is rotated in the clockwise direction by spring force. The pinch roller 50 thereby presses the magnetic tape 13 against the capstan 44. Since the capstan 44 is rotating in the counterclockwise direction, the magnetic tape 13 thus clamped between the capstan 44 and the pinch roller 50 is driven toward the right as viewed in FIG. 1.

On one hand, as the cam 59 rotates in the clockwise direction, the sliding bar 63 is actuated through the lever 66 and, guided by the pins 64*a* and 64*b*, slides to the left as viewed in FIG 4. The pins 68*a* and 68*b* are thereby disengaged from the recesses 63*a* and 63*b*, and the brake levers 67*a* and 67*b* are respectively turned in the counterclockwise and clockwise directions. Consequently, the brake shoes 70*a* and 70*b* separate from the reel discs 11*a* and 11*b* to release them from their braked states, whereby these reel discs become free to rotate.

The leftward sliding movement of the sliding bar 63 causes the roller 75 of the lever 72 to disengage from the projection 63*e*. Consequently, the lever 72 turns in the clockwise direction, and the pulley 74 presses against pulley 43. Accordingly, the pulley 74 is driven by the pulley 43 rotating in the counterclockwise direction and thereby rotates in the clockwise direction. The pulleys 79*a* and 79*b* are also driven by the belt 84 and rotate in the clockwise direction. These pulleys 79*a* and 79*b* are caused by the springs 83*a* and 83*b* to impart frictional force to the friction plates 82*a* and 82*b* through the felt pieces 81*a* and 81*b*. For this reason, the belt 84 travels in the arrow direction A, and since the pulleys 79*a* and 79*b* are rotating in the clockwise direction, the swinging arm 77 provided at its two ends with the friction plates 82*a* and 82*b* is rotated in the clockwise direction about the pivot 78. Consequently, the pulley 79*b* presses against the take-up disc of the reel disc 11*b* and transmits rotational power thereto thereby to rotate the disc in the counterclockwise direction. The magnetic tape 13 which has been unwound from the reel 12*a* and driven in traveling motion by the capstan 44 and pinch roller 50 is taken up by the reel 12*b* mounted on the reel disc 11*b* rotated in the counterclockwise direction.

On one hand, as the sliding bar 63 slides leftward, the lever 87 is turned in the clockwise direction, and the sliding cam bar 85 is moved to the right. The pin 92 fixed to and projecting from the lower surface of the swinging arm 77 enters the left part of the opening 91 of the swinging arm bar 85 and is released from the restraint by the necked part or constriction of the opening, thereby permitting the above-mentioned clockwise rotation of the swing arm 77. Furthermore, since the cam surface 85*a* of the sliding cam bar 85 is in the position indicated in FIG. 5, the swinging arm 77 is caused by the spring 89 to be at a lowered height position. For this reason, the pulley 79*b* contacts the take-up disc disposed below the reel disc 11*b*, and this reel disc 11*b* is rotated in the counterclockwise direction with their slips by way of rotational force through the friction disc and the take-up disc.

The leftward sliding movement of the sliding bar 63 further causes the extensions 104*a* and 104*b* of the rods 102*a* and 102*b* to be disenaged from the projections 63*c* and 63*d*, and the levers 100*a* and 100*b* are turned by springs (not shown) respectively in the counterclockwise and clockwise directions. Because of the counterclockwise rotation of the lever 100*a*, the rod 102*a* is pulled in the arrow direction B, and the pads 98*a* and 99*a* press the magnetic tape 13 against the magnetic heads 17*a* and 18*a*. Furthermore, since the extension 103*a* of the rod 102*a* moves in the arrow direction B, it does not contact the magnetic tape 13.

On the other hand, the extension 104 of the rod 102*b* is disengaged from the projection 63*d*, and the lever 100*b* turns somewhat in the clockwise direction. However since the swinging arm 77 turns in the clockwise direction as mentioned above, and the rod 105*b* is in the position indicated in FIG. 4, further rotation of the lever 100*b* in the clockwise direction is limited by the enlarged part 106*b* of the rod 105*b*, and the lever 100*b* is held in the position indicated in FIG. 4. For this reason, the lever 96*b* cannot turn beyond its position indicated in FIG. 4, and the pads 98*b* and 99*b* are held in positions separated from the heads 17*b* and 18*b*. Therefore. the magnetic tape 13 is pressed against only magnetic heads 17*a* and 18*a* when it is traveling toward the right.

The above mentioned leftward movement of the sliding bar 63 further causes the pin 108 of the lever 107 to fall into the recess 63*a*, and the lever 107 turns in the clockwise direction. The operating member 110 is thereby moved leftward to close the power-supply switch 109, whereby the electrical circuit including the ampifier is rendered operative.

Thus, the magnetic tape 13 is unwound from the reel 12*a*, contacts the magnetic heads 17*a* and 18*a*, where recording on or reproduction from the forward direction channel track of the tape is carried out, is driven in rightward travel by the capstan 44 and the pinch roller 50, and is then taken up and wound on the reel 12*b*. Upon completion of this recording or reproducing operation, a sensing tape adhered on the magnetic tape at that completion point contacts the sensing pole 15*a*. The recording or reproducing operation is thus electrically detected, and a solenoid (not shown) is energized, whereby a switch connected to a subcoil of the motor 40 is switched, and a current flows in the reverse direction through the subcoil. Accordingly, the motor 40 rotates in the direction reverse to that of the above described operation, that is, in the clockwise direction.

The reverse rotation of the motor 40 causes the capstan 44 to rotate also in the reverse direction, i.e., in the clockwise direction. Since the pinch roller 50 is still pressing the magnetic tape 13 against the capstan 44, the tape 13 is driven to travel toward the left.

Since the pulley 74 is rotated in the counterclockwise direction, the head 84 moves in the direction opposite to the arrow direction A, and the pulleys 79*a* and 79*b* are rotated in the counterclockwise direction. For this reason, the swinging arm 77 is turned in the counterclockwise direction about the pivot 78. The pulley 79*a* thereby presses against the take-up disc 94*a* provided below the reel disc 11*a*, which is thereby driven by this take-up disc 94*a* through the friction disc 93*a* to rotate in the clockwise direction.

As another result of the counterclockwise rotation of the swinging arm 77, the enlarged part 106*a* of the rod 105*a* pushes the lever 100*a* in clockwise rotation. The arm 97*a* and the lever 96*a* are pushed by the extension 103*a* of the rod 102*a*, and the pads 98*a* and 99*a* separate from the magnetic heads 17*a* and 18*a*. On the other hand, the lever 100*b* is disengaged by the enlarged part 106*b* of the rod 105*b* and therefore rotates further in the clockwise direction. The rod 102*b* is thereby pulled, and the pads 98*b* and 99*b* press the magnetic tape 13 against the magnetic heads 17*b* and 18*b*.

In this manner, the magnetic tape 13 is unwound from the reel 12*b*, contacts the magnetic heads 17*b* and 18*b*, where recording and reproducing on the reverse direction channel track is carried out, is driven in leftward travel by the capstan 44 and the pinch roller 50, and is then taken up on the reel 12*a*.

Next, the operation of fast tape travel will be described. For fast tape travel, the control knob 21 is turned in the counterclockwise direction to the position indicated "FAST." Accordingly, the cam 59 also rotates in the counterclockwise direction to assume the state indicated in FIG. 7. It is to be noted in this connection that at the time of fast travel of the magnetic tape in the forward path, the motor 40 rotates in the counterclockwise direction, while at the time of fast tape travel in the reverse (return) path, the motor 40 rotates in the clockwise direction. The following description relates to fast tape travel with respect to the tape return path.

Figure 7:
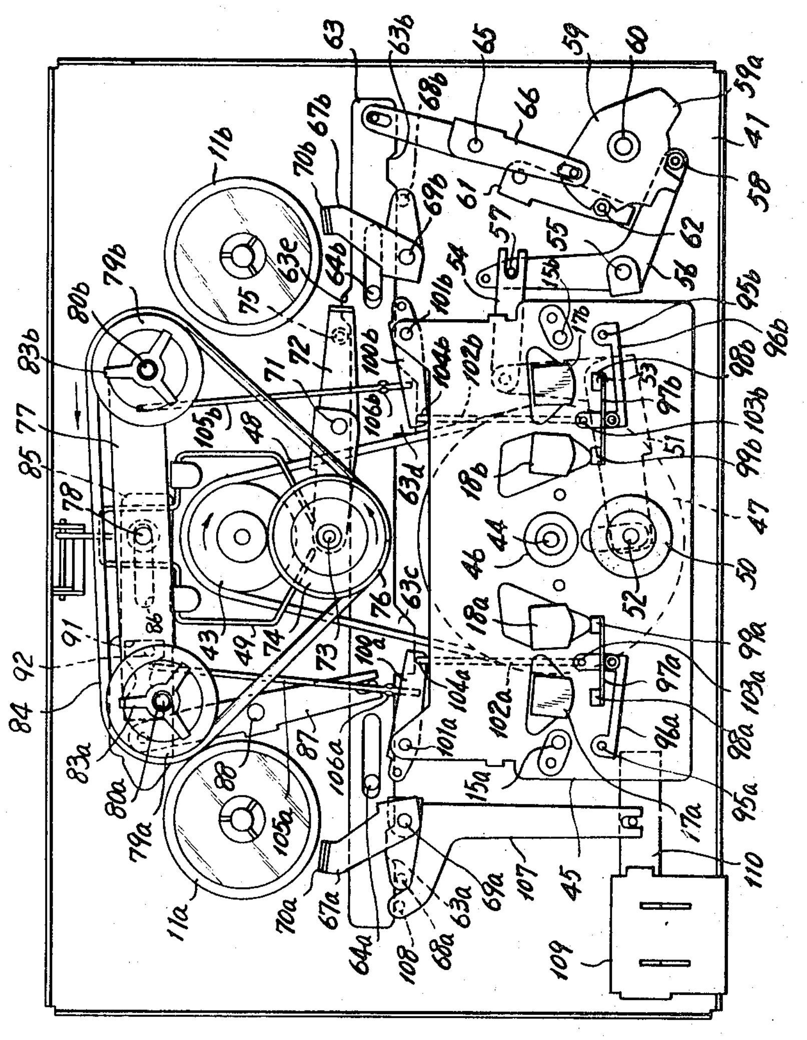
FIG. 7 is a plan view indicating the fast tape travel state of the mechanisms of the tape recorder of the invention.

When the cam 59 rotates to the position indicated in FIG. 7, the roller 58 reaches a valley part of the cam 59, and the lever 56 rotates to a position similar to that indicated in FIG. 2. The pinch roller 50 separates from the capstan 44 similarly as it does at the time when the tape recorder is stopped.

As another result of the above mentioned rotation of the cam 59, the sliding bar 63 is actuated by way of the lever 66 to move toward the right, whereupon the pins 68*a* and 68*b* disengage from the recesses 63*a* and 63*b*. The brake levers 67*a* and 67*b* are thereby rotated respectively in the counterclockwise and clockwise directions, and, accordingly, the brake shoes 70*a* and 70*b* are separated from the reel discs 11*a* and 11*b* similarly as they do at the time of recording or reproducing.

When the sliding bar 63 slides rightward, the roller 75 is in a position of disengagement from the projection 63*e*, and the lever 72 is also in a position where it has turned in the clockwise direction. For this reason, the pulley 74 is pressed into contact with the pulley 43 similarly as in the case of recording or reproducing. The pulley 74 is thereby rotated in the counterclockwise direction by the pulley 43 rotating in the clockwise direction, and the pulleys 79*a* also rotate in the counterclockwise direction, whereby the swinging arm 77 also rotates in the counterclockwise direction. At this time, as the sliding bar 63 slides rightward, the sliding cam bar 85 is driven through the lever 87 to slide leftward. Consequently, the pin 92 of the swinging arm 77 moves relative to the right part of the opening 91 of the sliding cam bar 85, and thereby permits the swinging arm 77 to turn in the counterclockwise direction.

As another result of the leftward sliding movement of the sliding cam bar 85, the swinging arm 77 is pushed upward along the cam surface 85 against the force of the spring 89 as indicated in FIG. 8. As a consequence, the pulley 79*a* is actuated by way of the belt 84 to be pressed into contact with the friction disc 93*a* and thereby to drive this disc directly.

While slippage occurs between the friction disc 93*a* and the reel disc 11*a* as a result of impact at the start of fast tape travel, frictional coupling between these two parts is sustained to an extent whereby slippage does not occur during steady-state conditions of fast tape travel. For this reason, the reel disc 11*a* is rotated at high speed in the clockwise direction. Therefore, the reel 12*a* mounted on the reel disc 11*a* is positively driven in rotation by the reel disc 11*a* and positively takes up the magnetic tape 13, thereby accomplishing fast tape travel with respect to the tape return path.

During this operation, as the sliding bar 63 slides rightward, the extensions 104*a* and 104*b* of the rods 102*a* and 102*b* move onto the projections 63*c* and 63*d*. Consequently, the arms 97*a* and 97*b* are pushed by the extensions 103*a* and 103*b*, and all of the pads 98*a*, 99*a*, 98*b*, and 99*b* are separated from the magnetic heads 17*a*, 18*a*, 17*b*, and 18*b* and cannot interfere with or obstruct the fast travel of the magnetic tape 13. Furthermore, since the pin 108 is not engaged in the recess 63*a*, the operating member 110 in a position where it has traveled rightward, and the switch 109 is open, whereby the amplifier is in inoperative state.

It will be apparent that in the case where the tape is to travel fast with respect to the forward path of the tape, the motor 40 is rotated in the counterclockwise direction. The operations of all of the various mechanism in this case will be readily understood from the foregoing description.

Further, this invention is not limited to these embodiments but various variations and modifications may be made without departing from the scope and spirit of the invention.

What I claim is:

1. A reciprocating drive type tape recorder comprising:

- first and second tape reel discs respectively supporting tape reels thereon and rotatable supported in mutually spaced-apart positions;
- a swinging arm pivotally supported at its middle part;
- first and second pulleys pivotally supported on respective ends of said swinging arm and disposed to confront respectively said two reel discs in spaced-apart relation thereto;
- a driving power source;
- a third pulley rotationally driven selectively in one direction or the reverse direction by said driving power source;
- an endless belt passed around said first, second, and third pulleys;
- friction plates respectively disposed on the ends of the swinging arm in frictional contact with the first and second pulleys thereby to impart to the swinging arm rotation power in directions corresponding to the rotational directions of the first and second pulleys;
- a capstan rotated selectively in one direction or the reverse direction;
- a pinch roller for pressing a magnetic tape against said capstan, said tape being unwound from one of said reels; and
- first and second groups of magnetic heads respectively on two opposite sides of the capstan and selectively operated in accordance with the direction of travel of said tape,
- said swinging arm being rotated in a direction corresponding to the direction of rotation of the first and second pulleys,
- said first and second pulleys operating to press selectively against the first and second tape reel discs to transmit rotational power thereto and thereby to rotate the same.

2. A reciprocating drive type tape recorder as set forth in claim 1 which further comprises first and second pressing means for pressing the magnetic tape against the first and second groups of magnetic heads and means for suppressing the pressing action of the pressing means on the side corresponding to that pulley of the first and second pulleys which is pressing against the reel disc in the accordance with the swinging direction of the swinging arm.

3. A reciprocating drive type tape recorder as set froth in claim 1 in which said driving power source comprises a single motor capable of rotating in one direction and the reverse direction, and said third pulley and said capstan are rotated by rotational power transmitted thereto from said motor.

4. A reciprocating drive type tape recorder as set forth in claim 1 which further comprises a sliding cam bar disposed below the swinging arm to be slidingly moved selectively between three positions corresponding to recording-reproducing, stopping, and fast tape traveling and having an opening of hour-glass shape and a pin provided on the lower surface of the swinging arm and fitted in said opening, said pin being positioned in the constricted part of the opening of hour-glass shape when said sliding cam bar is in the stopping position.

5. A reciprocating drive type tape recorder as set forth in claim 4 in which: each of said reel discs comprises a reel mounting base, a friction disc, and a take-up disc frictionally coupled together; said swinging arm is journaled in a manner permitting vertical movement thereof; and the sliding cam bar has a cam surface for actuating the swinging arm in vertical movment thereby to cause the first and second pulleys to confront the take-up discs at the time of recording and reproducing operation and to confront the friction discs at the time of fast tape travel.

6. A reciprocating drive type tape recorder as set forth in claim 4 which further comprises: a sliding member extending parallell to the line on which the centers of the two reel discs lie and actuated to slide between three positions corresponding to recording-reproducing, stopping, and fast tape traveling; means for transmitting the sliding movement of said sliding member to the sliding cam bar; first and second pressing means operating in accordance with the sliding movement of the sliding member to press the magnetic tape against the first and second groups of magnetic heads; and means for suppressing the pressing action of the pressing means on the side corresponding to that pulley of the first and second pulleys which is pressed against the reel base in accordance with the swinging direction of the swinging arm.

* * * * *